United States Patent
Long (10) Patent No.: US 7,982,746 B2
(45) Date of Patent: Jul. 19, 2011

(54) SIMPLIFICATION OF ALPHA COMPOSITING IN THE PRESENCE OF TRANSFER FUNCTIONS

(75) Inventor: Timothy Merrick Long, Lindfield (AU)

(73) Assignee: Canon Kabushiki Kaisha, Tokyo (JP)

( * ) Notice: Subject to any disclaimer, the term of this patent is extended or adjusted under 35 U.S.C. 154(b) by 388 days.

(21) Appl. No.: 11/418,150

(22) Filed: May 5, 2006

(65) Prior Publication Data

US 2006/0268000 A1    Nov. 30, 2006

(30) Foreign Application Priority Data

May 6, 2005   (AU) ................................ 2005201930

(51) Int. Cl.
*G09G 5/02* (2006.01)
(52) U.S. Cl. ........................................ 345/592; 345/589
(58) Field of Classification Search .................. None
See application file for complete search history.

(56) References Cited

U.S. PATENT DOCUMENTS

| | | | | |
|---|---|---|---|---|
| 5,303,334 A * | 4/1994 | Snyder et al. | ................. | 358/1.9 |
| 5,307,452 A | 4/1994 | Hahn et al. | ................. | 395/132 |
| 5,347,620 A | 9/1994 | Zimmer | ................. | 395/129 |
| 5,499,323 A | 3/1996 | Doi et al. | ................. | 395/126 |
| 6,421,460 B1 | 7/2002 | Hamburg | ................. | 382/162 |
| 6,483,519 B1 | 11/2002 | Long et al. | ................. | 345/619 |
| 6,694,041 B1 * | 2/2004 | Brunk | ................. | 382/100 |
| 6,825,852 B1 | 11/2004 | Hamburg | ................. | 345/592 |
| 6,987,520 B2 * | 1/2006 | Criminisi et al. | ................. | 345/629 |
| 7,084,878 B2 | 8/2006 | Herceg et al. | ................. | 345/555 |

(Continued)

OTHER PUBLICATIONS

Jurriaan D. Mulder, Frans C. A, Groen Jarke, J. Wijk, "Pixel Masks for Screen-Door Transparency", In Proceedings of the Conference on Visualization '98 (Research Triangle Park, North Carolina, United States, Oct. 18-23, 1998). IEEE Visualization. IEEE Computer Society Press, Los Alamitos, CA.*

(Continued)

*Primary Examiner* — Daniel F Hajnik
(74) *Attorney, Agent, or Firm* — Fitzpatrick, Cella, Harper & Scinto (57) ABSTRACT

A method determines a color at a plurality of locations in a region of overlap of a first graphic element and a second graphic element, with each graphic element having a color value and a partial opacity value defined at each location. The method includes the steps of determining a transfer color as a combination of the color value of the first graphic element and the color value of the second graphic element, with the transfer color being independent of the opacity values of each element, and determining a first color value of a set of possible color values. At least one color value in the set of possible color values is derived from the transfer color, and another color value in the set of possible color values is derived from the color value of at least one of the first graphical element and the second graphical element. Additional steps include selecting the first color value from the set of possible color values to determine the color at a first selected location in the region of overlap, and determining a second color value from the set of possible color values, and selecting the second color value for a second selected location in the region of overlap. The selection of the first and second color values is at least dependent upon the partial opacity value of the first or second graphical elements.

4 Claims, 6 Drawing Sheets

U.S. PATENT DOCUMENTS

| | | | |
|---|---|---|---|
| 7,286,142 B2* | 10/2007 | Smith et al. | 345/629 |
| 7,369,276 B2* | 5/2008 | Couwenhoven et al. | 358/3.03 |
| 2004/0004626 A1* | 1/2004 | Ida et al. | 345/626 |
| 2006/0187235 A1* | 8/2006 | Hamburg | 345/592 |
| 2006/0244748 A1 | 11/2006 | Long et al. | 345/422 |

OTHER PUBLICATIONS

T. Porter, et al., "Compositing Digital Images", Computer Graphics, vol. 18, No. 3, pp. 253-259 (Jul. 1984).

* cited by examiner

SIMPLIFICATION OF ALPHA COMPOSITING IN THE PRESENCE OF TRANSFER FUNCTIONS

FIELD OF THE INVENTION

The present invention relates generally to image processing and, in particular, to a method and apparatus for combining a first graphic element and a second graphic element. The present invention also relates to a computer readable medium having recorded thereon a computer program for combining a first graphic element and a second graphic element.

BACKGROUND

Two raster graphic elements, both of which have color and opacity (also known as "alpha" and "transparency") defined at each point of the elements may be combined. These two elements may be combined through a method of compositing for example as described by Porter and Duff in the publication entitled "Compositing Digital Images"; *Computer Graphics*, Vol. 18 No. 3 (1984) pp. 253-259 (hereafter Porter and Duff). In particular, in this method, an upper (or source) graphic element (s) and a lower (or destination) graphic element (d) may be composited together with an over operator (one of several operators defined in the publication). The composition of the graphic elements produces a resultant graphic element (r) in accordance with the following Equations (1) and (2) applied at each point (e.g., a pixel):

$$ro = do*(1-so) + so \qquad (1)$$

$$rc = (dc*do*(1-so) + sc*so)/ro \qquad (2)$$

where:
ro represents a result opacity (a value ranging from 0 ... 1 representing the degree of opacity, with 0 being completely transparent and 1 being completely opaque);
do represents opacity of the lower graphic element;
so represents opacity of the upper graphic element;
rc represents a result color. There may be several color channels in a graphic element, such as red, green, and blue for a color image. The rc calculation is used for each such channel;
dc represents the color of a lower graphic element; and
sc represents the color of an upper graphic element.

To simplify the compositing equations (and operations) for simple compositing it is sometimes convenient to use pre-multiplied color values. A pre-multiplied color value is the color value multiplied by the corresponding opacity value. For example, in pre-multiplied form, the Porter and Duff over operation becomes:

$$ro = do*(1-so) + so \qquad (3)$$

$$rco = dco*(1-so) + sco \qquad (4)$$

where:
rco represents rc*ro;
dco represents dc*do; and
sco represents sc*so.

However, pre-multiplied forms of the Porter and Duff compositing operations are only usefull to a sub-set of compositing operations. In the remainder of this description, operations will be described in terms of un-premultiplied values unless otherwise stated.

A second known method of combining two graphic elements is based upon combining the colors of pairs of opaque graphic elements. Examples of such color combining operations include bit-wise logical raster operations ("raster ops") as exercised by Microsoft Windows Graphical Device Interface (GDI) Application Programming Interface (API) with operations such as R2_MERGEPEN (bitwise OR), and R2_MASKPEN (bitwise AND). Such color combining operations also include "transfer modes" as exercised by Adobe Photoshop with functions such as LIGHTEN, and DARKEN. The above operations, which are just examples of a large class of functions, are defined in Table 1 as follows:

TABLE 1

| Operation | Equation |
| --- | --- |
| R2_MERGEPEN | rc = sc \| dc |
| R2_MASKPEN | rc = sc & dc |
| LIGHTEN | rc = MAX(sc, dc) |
| DARKEN | rc = MIN(sc, dc) |

Many such operations are possible and exercised by various graphic systems. However, the above definitions assume both s and d are completely opaque elements. A generalization of color combining operations where a graphic element with non-unity opacity (referred to herein as a semi-transparent element) is being combined with a transfer function onto (i.e., over) an opaque background element is exercised in Adobe PhotoShop and described in U.S. Pat. No. 6,421,460 (Hamburg). Hamburg discloses the following compositing equation:

$$ro = 1 \qquad (5)$$

$$rc = T(sc, dc)*so + dc*(1-so) \qquad (6)$$

where T is the transfer function (such as LIGHTEN or DARKEN) producing a transfer color.

Note however that in the above case the lower graphic element (d) is assumed to be fully opaque.

U.S. Pat. No. 6,483,519 by Long et. al. (also U.S. patent application Ser. No. 10/176,644 filed Nov. 24, 2002, by Long et. al.) describes a method of combining two graphical objects (an upper graphic element and a lower graphic element) with a transfer function, both objects having a non-unity opacity value. U.S. Pat. No. 6,421,460 by Hamburg, describes a less generic method for combining an upper graphic element and a lower graphic element. The method of combining two graphic elements described above uses the equations:

$$ro = do*(1-so) + so*do + so*(1-do) \qquad (7)$$

$$rc = (dc*do*(1-so) + T(sc, dc)*so*do + sc*so*(1-do))/ro \qquad (8)$$

These equations can be derived by extending the ideas of Porter and Duff. They allow the combination of semi-transparent graphic elements with raster operations such as R2_MERGEPEN or transfer functions such as LIGHTEN. Such color combining operations had previously been considered incompatible with partial opacity of the lower graphic element.

Whilst Long et. al. (U.S. Pat. No. 6,483,519) describes a graphics accelerator capable of efficiently performing the above generalized technique, for systems without such an accelerator there are a number of practical difficulties in using the above technique. Firstly, the compositing equations are computationally expensive and must be performed on every pixel pair of the two operands of an operation. Such computation is a heavy burden when carried out in a software system. Compounding this problem is the common use of graphics acceleration based on application specific integrated circuits. Graphics accelerators are now commonly used in desktop computers and printers to achieve an acceptable level of graphics performance. However, such accelerators have only a limited repertoire of primitive operations. These primitive operations may include both Porter and Duff compositing, and/or raster operations (or transfer functions), however they do not usually allow the general case of Porter and Duff compositing in the presence of raster operations (or transfer functions) where both operands can have transparency, as described above. This can present considerable difficulties since there are large time penalties for stopping the pipeline of a graphics accelerator in order to substitute software calculations for aspects that the graphics accelerator is unable to compute. When combined with the very expensive calculations described above, the performance penalty is large.

Thus, a need clearly exists for a more efficient method of combining a first graphic element and a second graphic element, where this combining may be performed by accelerators that have a limited repertoire of primitive operations as described above.

SUMMARY

It is an object of the present invention to substantially overcome, or at least ameliorate, one or more disadvantages of existing arrangements.

According to one aspect of the present invention there is provided a method of determining a color at a location in a region of overlap of a first graphic element and a second graphic element, each said graphic element having a color value and an opacity value defined at a plurality of locations, the method comprising the steps of:

a) determining a transfer color as a combination of the color value of the first graphic element and the color value of the second graphic element, said transfer color being independent of the opacity values of each said element;

b) determining at least one color value of possible color values with said at least one color value being derived from the transfer color; and c) selecting, for at least one location in said overlap region, said at least one color value from the possible color values, said selection being dependent upon at least one of the opacity value of the first or second graphical element.

According to another aspect of the present invention there is provided a method of combining an upper graphic element and a lower graphic element, each with color and opacity defined at a plurality of locations, and a background graphic element with color defined at a plurality of locations, to produce an updated background graphic element, said method being characterized in that:

a) a transfer color is the result of a function combining an upper element color with a lower element color without regard to either the upper element opacity or the lower element opacity;

b) the color of a location in the updated background element is one of a palette of colors defined for that location, which one being dependent on either the upper element opacity, the lower element opacity, or both; and c) one of the colors of the palette is dependent on the transfer color.

According to still another aspect of the present invention there is provided a method of combining an upper graphic element and a lower graphic element, each with color and opacity defined at a plurality of locations, said method comprising the steps of:

a) combining the color of said upper graphic element with the color of said lower graphic element using a transfer function, without regard to the opacity of said lower graphic element, to determine a combination graphic element;

b) determining at least one mask using the opacity of said lower graphic element, or the opacity of said upper graphic element, or both; and c) combining said combination graphic element with either the upper graphic element, or the lower graphic element, or both, subject to masking by said at least one mask.

According to still another aspect of the present invention there is provided an apparatus for determining a color at a location in a region of overlap of a first graphic element and a second graphic element, each said graphic element having a color value and an opacity value defined at a plurality of locations, said apparatus comprising:

transfer color determining means for determining a transfer color as a combination of the color value of the first graphic element and the color value of the second graphic element, said transfer color being independent of the opacity values of each said element;

color value determining means for determining at least one color value of possible color values with said at least one color value being derived from the transfer color;

selection means for selecting, for at least one location in said overlap region, said at least one color value from the possible color values, said selection being dependent upon at least one of the opacity value of the first or second graphical element.

According to still another aspect of the present invention there is provided an apparatus for combining an upper graphic element, and a lower graphic element, each with color and opacity defined at a plurality of locations, and a background graphic element with color defined at a plurality of locations, to produce an updated background graphic element, said apparatus being characterized in that:

a) a transfer color is the result of a function combining an upper element color with a lower element color without regard to either the upper element opacity or the lower element opacity;

b) the color of a location in the updated background element is one of a palette of colors defined for that location, which one being dependent on either the upper element opacity, the lower element opacity, or both; and c) one of the colors of the palette is dependent on the transfer color.

According to still another aspect of the present invention there is provided an apparatus for combining an upper graphic element and a lower graphic element, each with color and opacity defined at a plurality of locations, said apparatus comprising:

first combining means for combining the said upper graphic element with the color of said lower graphic element using a transfer function, without regard to the opacity of said lower graphic element, to determine a combination graphic element;

mask determining means for determining at least one mask using the opacity of said lower graphic element, or the opacity of said upper graphic element, or both; and second combining means for combining said combination graphic element with either the upper graphic element, or the lower graphic element, or both, subject to masking by said at least one mask.

According to still another aspect of the present invention there is provided a computer program product having a computer readable medium having a computer program recorded therein for determining a color at a location in a region of overlap of a first graphic element and a second graphic element, each said graphic element having a color value and an opacity value defined at a plurality of locations, the computer program comprising:

code for determining a transfer color as a combination of the color value of the first graphic element and the color value of the second graphic element, said transfer color being independent of the opacity values of each said element;

code for determining at least one color value of possible color values with said at least one color value being derived from the transfer color; and code for selecting, for at least one location in said overlap region, said at least one color value from the possible color values, said selection being dependent upon at least one of the opacity value of the first or second graphical element.

According to still another aspect of the present invention there is provided a computer program product having a computer readable medium having a computer program recorded therein for combining an upper graphic element, and a lower graphic element, each with color and opacity defined at a plurality of locations, and a background graphic element with color defined at a plurality of locations, to produce an updated background graphic element, said computer program product being characterized in that:

a) a transfer color is the result of a function combining an upper element color with a lower element color without regard to either the upper element opacity or the lower element opacity;
   b) the color of a location in the updated background element is one of a palette of colors defined for that location, which one being dependent on either the upper element opacity, the lower element opacity, or both; and
   c) one of the colors of the palette is dependent on the transfer color.

According to still another aspect of the present invention there is provided a computer program product having a computer readable medium having a computer program recorded therein for combining an upper graphic element and a lower graphic element, each with color and opacity defined at a plurality of locations, said computer program product comprising:

computer program code means for combining the said upper graphic element with the color of said lower graphic element using a transfer function, without regard to the opacity of said lower graphic element, to determine a combination graphic element;

computer program code means for determining at least one mask using the opacity of said lower graphic element, or the opacity of said upper graphic element, or both; and computer program code means for combining said combination graphic element with either the upper graphic element, or the lower graphic element, or both, subject to masking by said at least one mask.

According to still another aspect of the present invention there is provided a method of combining an upper graphic element and a lower graphic element to produce a result graphic element, said upper graphic element and said lower graphic element comprising color and opacity, said method comprising the steps of:

combining the color of said upper graphic element with the color of said lower graphic element using a transfer function, without regard to either opacity of said upper graphic element or opacity of said lower graphic element, to determine a combination graphic element;

determining a mask using the opacity of said lower graphic element and a halftone dither matrix; and combining said combination graphic element with said upper graphic element according to said mask to produce said result graphic element, wherein color of a location in said result graphic element is one of a palette of colors defined for said location, said one color being dependent on one of either the opacity of said upper graphic element or the opacity of said lower graphic element.

Other aspects of the invention are also disclosed.

BRIEF DESCRIPTION OF THE DRAWINGS

One or more embodiments of the present invention will now be described with reference to the drawings and appendices, in which.

DETAILED DESCRIPTION INCLUDING BEST MODE

Where reference is made in any one or more of the accompanying drawings to steps and/or features, which have the same reference numerals, those steps and/or features have for the purposes of this description the same function(s) or operation(s), unless the contrary intention appears.

A method 300 (see FIG. 3) of combining an upper (or first) graphic element and a lower (or second) graphic element, according to one embodiment of the present invention, will now be described below with reference to FIGS. 1 to 4. The method 300 achieves a substantially similar visual result to generalized Porter and Duff compositing in the presence of a transfer function, while only using a series of simpler graphical operations. These simpler graphical operations may be performed by a graphics accelerator that does not support generalized Porter and Duff compositing in the presence of a transfer function. One or both of the graphic elements are treated as purely opaque elements and are combined by a transfer function using available simple (preferably accelerated) operations.

Using a series of masked and/or un-masked painting operations (preferably accelerated), the upper graphic element, the lower graphic element, or the combination of the two graphic elements are painted to the result in patterns. These patterns achieve a visually similar result to generalized Porter and Duff compositing in the presence of a transfer function described in Long et. al. (U.S. Pat. No. 6,483,519). The result, although different in detailed pixel values from the true color generated by generalized Porter and Duff compositing in the presence of a transfer function, has a similar overall visual appearance. This similar visual appearance is produced through a set of simple operations that may be accelerated by many graphics accelerators which do not support generalized Porter and Duff compositing in the presence of transfer functions.

Figure 1:
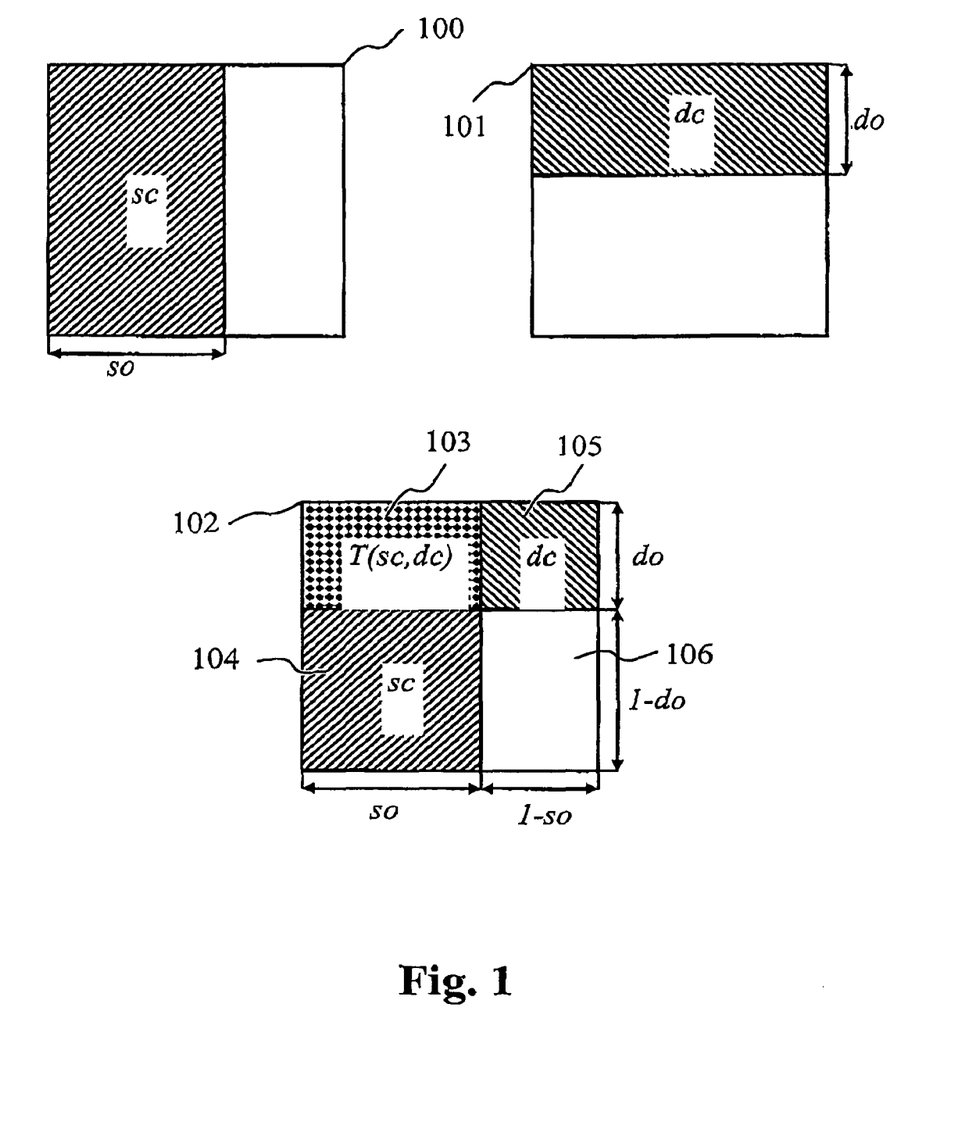
FIG. 1 shows a first pixel, which has color sc (i.e., first element color, upper element color or source color) and opacity so (i.e., first element opacity, upper element opacity or source opacity) a second pixel, which has color dc (second element color, lower element color or destination color) and opacity do (second element opacity, lower element opacity or destination opacity) and a result pixel determined by combining the first and second pixel.
Figure 2A:
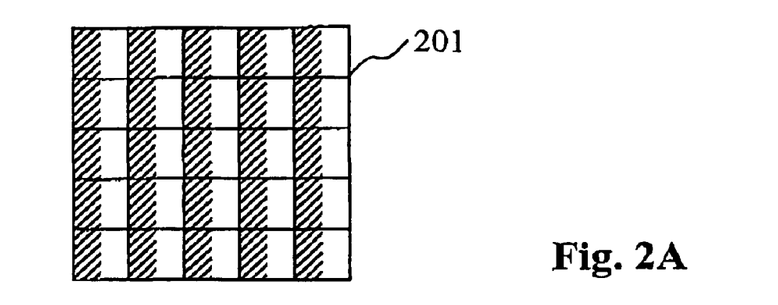
FIG. 2A shows a 5×5 pixel upper (or first) graphic element which has a color and opacity at each pixel.
Figure 2B:
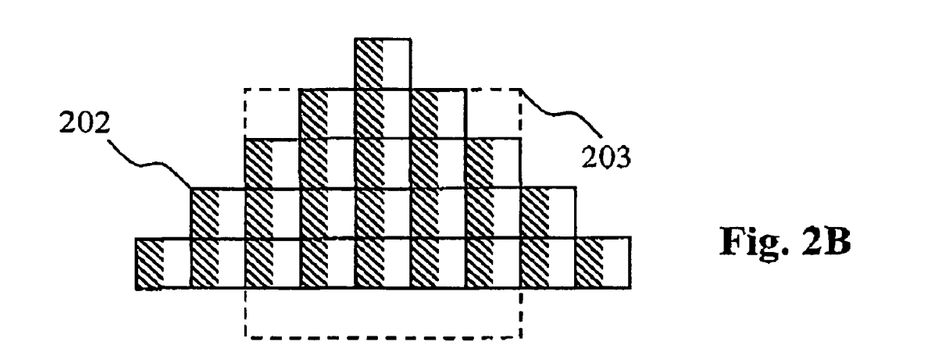
FIG. 2B shows a lower (or second) graphic element, which is a triangle.
Figure 2C:
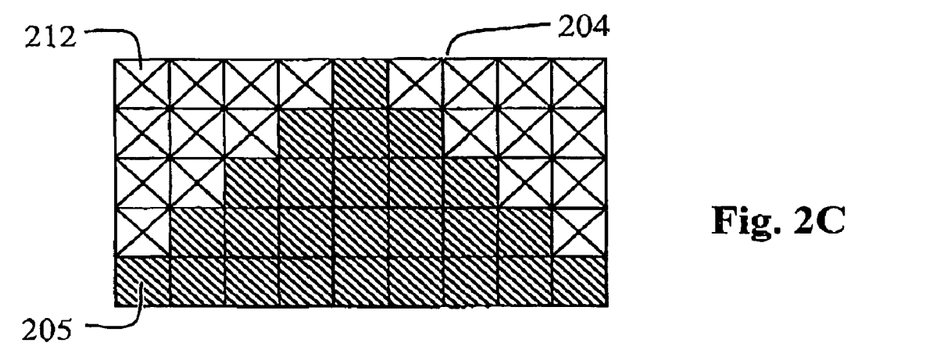
FIG. 2C shows the lower graphic element of FIG. 2B copied to a temporary buffer without the opacity of the lower graphic element.
Figure 2D:
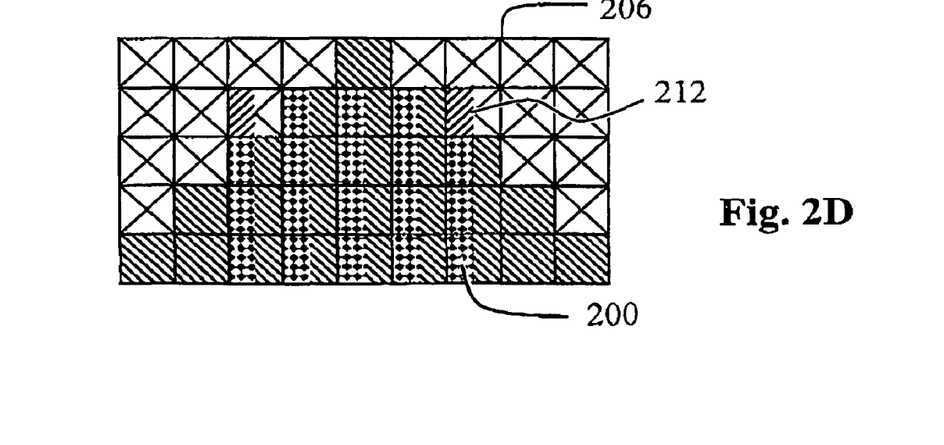
FIG. 2D shows the result of compositing the upper graphic element of FIG. 2A over the temporary buffer of FIG. 2C using a transfer function.
Figure 2E:
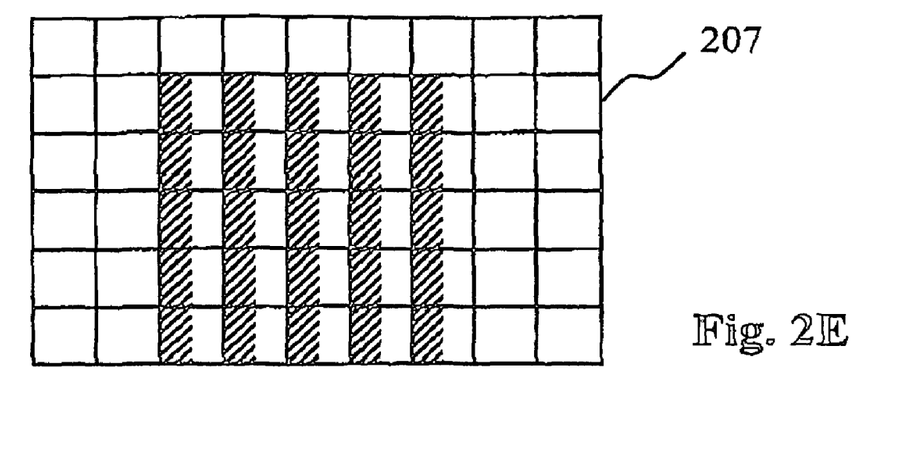
FIG. 2E shows the upper graphic element copied to a result buffer.
Figure 2F:
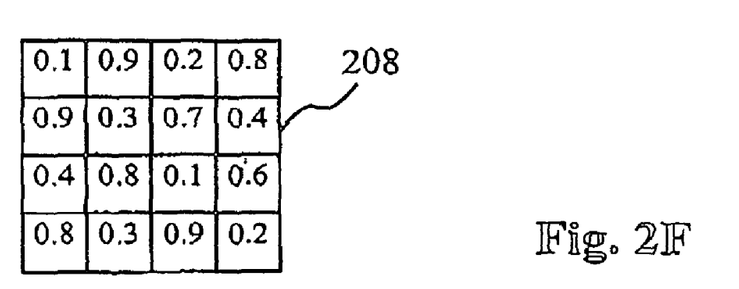
FIG. 2F shows a dither matrix.
Figure 2G:
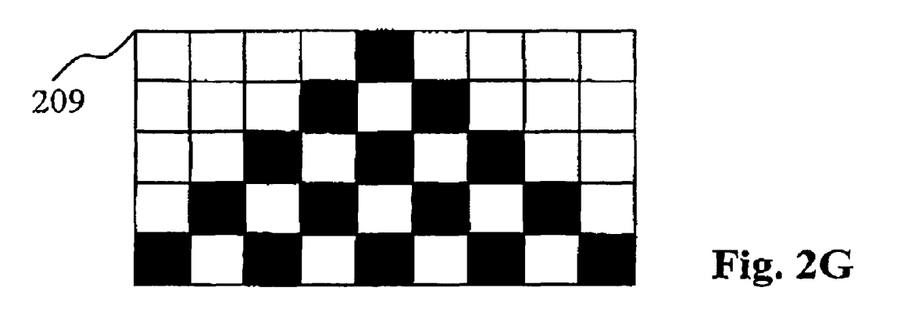
FIG. 2G shows a mask produced using the opacity component of the lower graphic element and the halftone dither matrix of FIG. 2F.
Figure 2H:
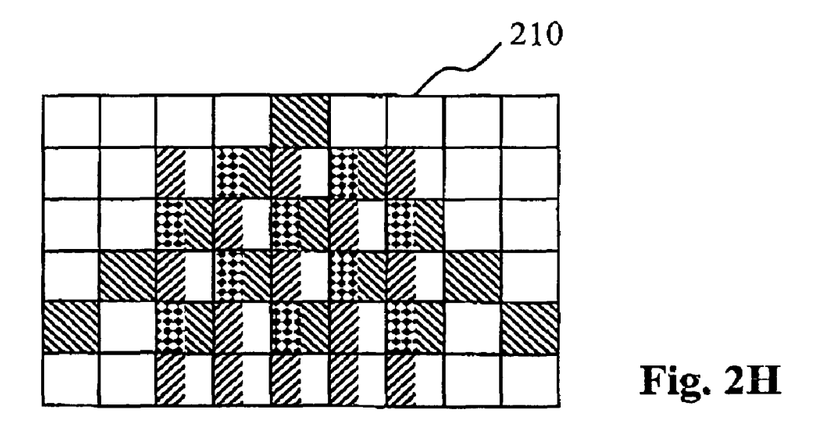
FIG. 2H shows the temporary buffer of FIG. 2C copied onto the result buffer of FIG. 2D through the mask of FIG. 2G.
Figure 2I:
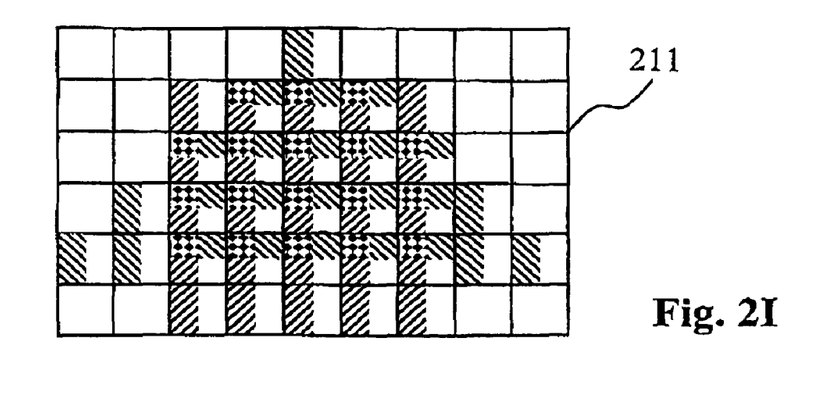
FIG. 2I shows the true result of compositing the upper graphic element of FIG. 2A with the lower graphic element of FIG. 2B using a transfer function.
Figure 3:
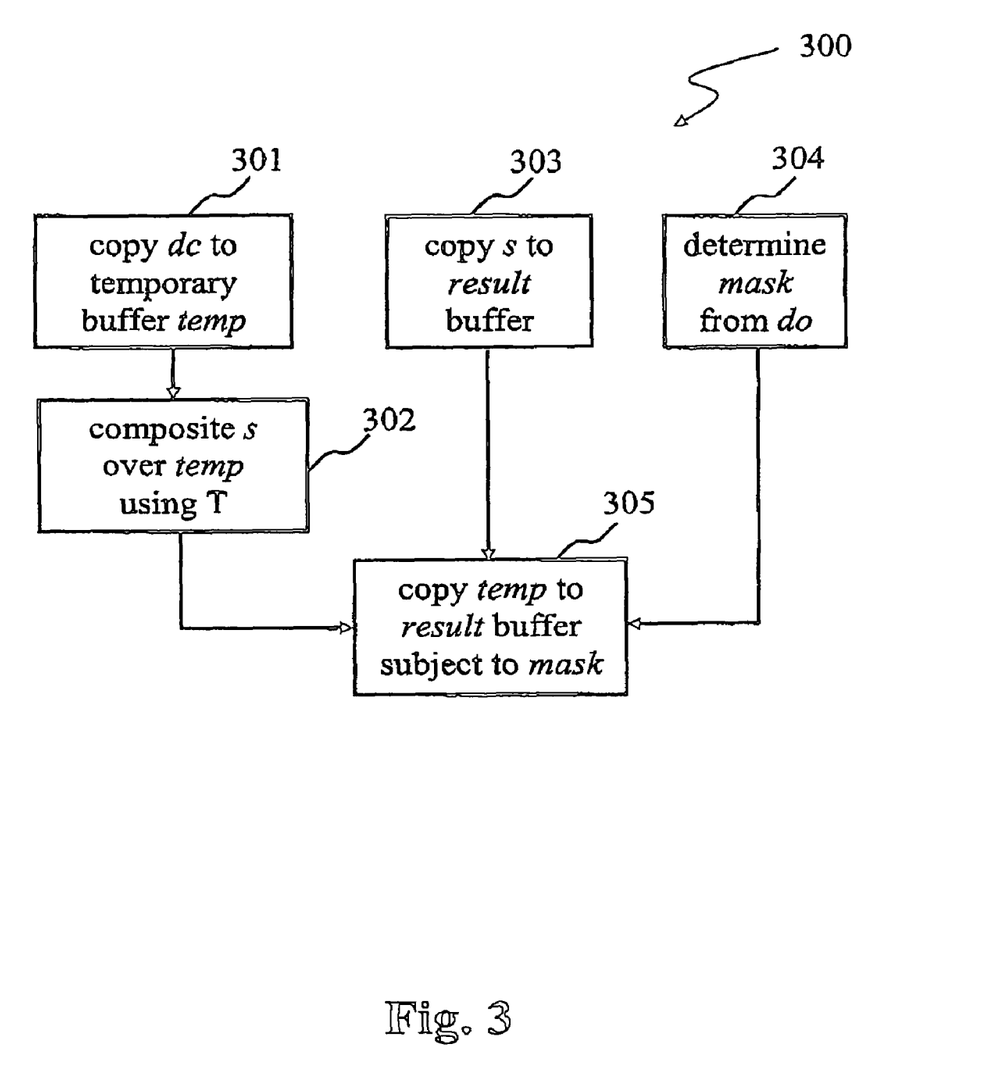
FIG. 3 is a flow diagram showing a method of combining an upper (or first) graphic element and a lower (or second) graphic element.
Figure 4:
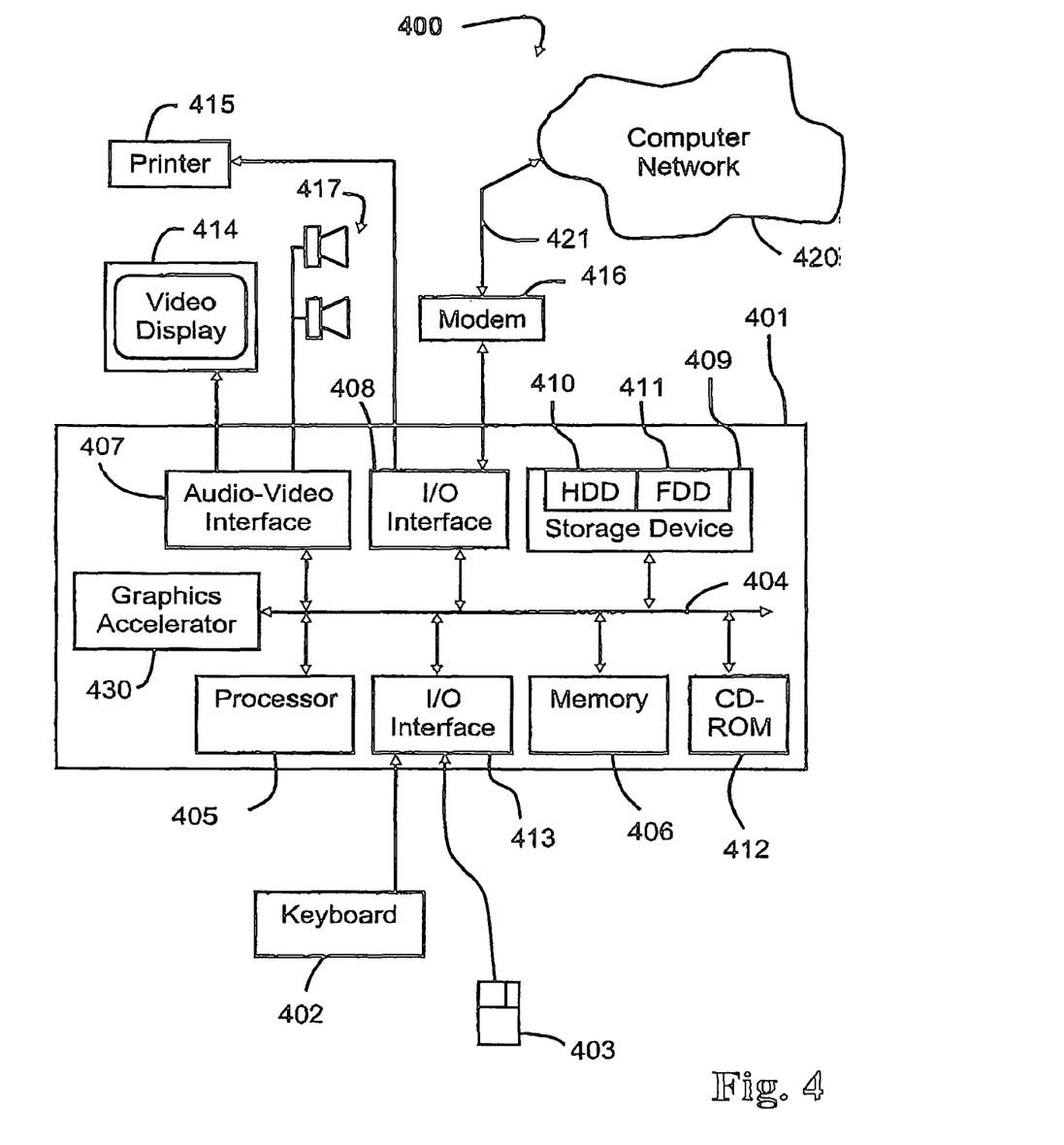
FIG. 4 is a schematic block diagram of a general purpose computer with graphics accelerator upon which arrangements described can be practiced.

The method 300 is preferably practiced using a general-purpose computer system 400, such as that shown in FIG. 4 wherein the processes of FIGS. 1 to 3 may be implemented as software, such as an application program executing within the computer system 400. Preferably the software uses a graphics accelerator 430 to accelerate certain primitive operations. In particular, the steps of the method 300 are effected by instructions in the software that are carried out by the computer. The instructions may be formed as one or more code modules, each for performing one or more particular tasks. The software may also be divided into two separate parts, in which a first part performs the method 300 and a second part manages a user interface between the first part and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for implementing the method 300.

The computer system 400 is formed by a computer module 401, input devices such as a keyboard 402 and mouse 403, output devices including a printer 415, a display device 414 and loudspeakers 417. A Modulator-Demodulator (Modem) transceiver device 416 is used by the computer module 401 for communicating to and from a communications network 420, for example connectable via a telephone line 421 or other functional medium. The modem 416 can be used to obtain access to the Internet, and other network systems, such as a Local Area Network (LAN) or a Wide Area Network (WAN), and may be incorporated into the computer module 401 in some implementations.

The computer module 401 typically includes at least one processor unit 405, and a memory unit 406, for example formed from semiconductor random access memory (RAM) and read only memory (ROM). The module 401 also includes an number of input/output (I/O) interfaces including an audio-video interface 407 that couples to the video display 414 and loudspeakers 417, an I/O interface 413 for the keyboard 402 and mouse 403 and optionally a joystick (not illustrated), and an interface 408 for the modem 416 and printer 415. In some implementations, the modem 416 may be incorporated within the computer module 401, for example within the interface 408. A storage device 409 is provided and typically includes a hard disk drive 410 and a floppy disk drive 411. A magnetic tape drive (not illustrated) may also be used. A CD-ROM drive 412 is typically provided as a non-volatile source of data. The components 405 to 413 of the computer module 401, typically communicate via an interconnected bus 404 and in a manner which results in a conventional mode of operation of the computer system 400 known to those in the relevant art. Examples of computers on which the described arrangements can be practised include IBM-PC's and compatibles, Sun Sparcstations or alike computer systems evolved therefrom.

Typically, the application program is resident on the hard disk drive 410 and read and controlled in its execution by the processor 405. Intermediate storage of the program and any data fetched from the network 420 may be accomplished using the semiconductor memory 406, possibly in concert with the hard disk drive 410. In some instances, the application program may be supplied to the user encoded on a CD-ROM or floppy disk and read via the corresponding drive 412 or 411, or alternatively may be read by the user from the network 420 via the modem device 416. Still further, the software can also be loaded into the computer system 400 from other computer readable media. The term "computer readable medium" as used herein refers to any storage or transmission medium that participates in providing instructions and/or data to the computer system 400 for execution and/or processing. Examples of storage media include floppy disks, magnetic tape, CD-ROM, hard disk drive, ROM or integrated circuit, magneto-optical disk, or computer readable card, and the like, whether or not such devices are internal or external of the computer module 401.

The method 300 may alternatively be implemented in dedicated hardware such as one or more integrated circuits performing the functions or sub functions of the described method. Such dedicated hardware may include graphic processors, digital signal processors, or one or more microprocessors and associated memories.

In the alpha compositing method disclosed by Porter and Duff, the opacity value of a pixel is the proportion of a background (or background graphic element) that the pixel covers. That is, a pixel is conceptually regarded as an area of opaque color with a hole through which the color of the background graphic element is visible. In this conceptual model the transparency of a pixel is represented by the size of the hole. Of course, this model of a pixel regards a digital image as being tessellated into an array of pixels, each of which covers an area. Other models, such as that used by sampling theory are different, but will not be considered here.

FIG. 1 shows a conceptual representation of a first pixel 100 (first graphic element, upper graphic element or source graphic element), which has color sc (i.e., first element color, upper element color or source color) and opacity so (i.e., first element opacity, upper element opacity or source opacity). The opaque color of the pixel 100 has been arranged at a location on the left of a unit square and the transparent hole on the right. FIG. 1 shows conceptual representation of a second pixel 101 (second graphic element, lower graphic element or destination graphic element), which has color dc (i.e., second element color, lower element color or destination color) and opacity do (second element opacity, lower element opacity or destination opacity). In the second pixel 101 the color has been arranged at a top location and the transparent hole at a bottom location of the pixel 101, as seen FIG. 1. The different arrangements (or subdivisions) between the first pixel and the second pixel represents, conceptually, the independent aspect of the color and transparency of the first pixel 100 and the second pixel 101 before the pixels are combined. The first pixel 100 and the second pixel 101 may be combined using a transfer function, T(sc, dc) to produce the resultant pixel 102 (or result graphic element). The resultant pixel 102 is the basis of Porter and Duff compositing and its generalisation to handle transfer functions. The color of the resultant pixel (with result color rc and result opacity ro) is the weighted average of the colors of areas 103, 104 and 105; the weights being proportional to the areas of 103, 104, and 105 respectively. The opacity of the resultant pixel 102 is the sum of the areas of 103, 104, and 105 (or in alternate expression, the resultant transparency is the area of 106). In particular, the result opacity ro and result color rc of the pixel 102 may be determined in accordance with Equations (7) and (8) as described above.

In the absence of primitive operations to support the determination of the result opacity and color in accordance Equations (7) and (8), the method 300 uses a series of available primitive operations. The exact sequence of primitive operations depends on the available primitive operations of the graphics accelerator 430 being used by the computer system 400. Examples of primitive capabilities of graphics accelerators include the following:

A. The capability to perform a transfer function possibly limited to a raster operation) to combine the color of two opaque operands. This capability is available in accelerators commonly used in personal computers, for instance those running Microsoft Windows and can be accessed through the GDI API;

B. As above for A., plus the capability to composite a semi-transparent operand over an opaque background graphic element. This capability is available in Microsoft Windows GDI+ API;

C. As above for B., plus the capability to composite a semi-transparent operand over a second semi-transparent operand. This capability is commonly available in three dimensional (3D) accelerators used in personal computers and may be accessed through the OpenGL API. Often the full range of Porter and Duff operators is available as well, however only over will be considered herein;

D. As above for C., plus the capability to composite a semi-transparent operand over an opaque operand subject to a transfer function;

E. As above for D., plus the capability to composite a semi-transparent operand over a second semi-transparent operand subject to a transfer function;

F. As above for E., plus the capability to composite a semi-transparent operand with a second semi-transparent operand using any Porter and Duff compositing operator subject to a transfer function.

The methods of the preferred embodiment concern the efficient achievement of capability E in environments with capabilities limited to one of the capabilities A. through D. The methods of the preferred embodiment are based on recognition that certain of the color and opacity values contributing to the true pixel color (hereafter "contributing values") may be generated with lower capability graphics accelerator operations. In particular, the opaque transfer color T(sc, dc) alone, of region 103, may be achieved with capability A., as may the opaque color sc of region 104 and the opaque color dc of the region 105. Opaque color values may be obtained from partially opaque color values simply by ignoring (i.e., without having regard to) associated opacity. Purely transparent pixels may also be achieved. Further, certain pair-wise blends of the colors may also be achieved with capability D., specifically the weighted average between the opaque transfer color T(sc, dc) of area 103 and the opaque destination color dc of area 105.

The methods of the preferred embodiment achieve a similar visual result by selecting one contributing value at each pixel, where the probability of selecting any one contributing value is weighted in the same manner as a weighted average which would be used to achieve the true color. Thus, for example, if a palette of contributing values representing colors consists of each of the opaque colors T(sc, dc), sc, and dc, the relative probability of a result pixel being each of those colors will be, by construction, the area of regions 103, 104, and 105 respectively. There is a remaining probability that the result pixel will be none of these colors, representing the transparent hole 106. In this case, the result pixel is fully transparent.

There are a number of different palettes from which contributing values may be selected. The ones of interest to the described methods are listed in the Table 2, below, where dotted lines delimit alternative palettes.

TABLE 2

| Label | Based on regions | Color | Opacity | Relative probability |
|---|---|---|---|---|
| sc | 104 | sc | 1 | so * (1 − do) |
| dc | 105 | dc | 1 | do * (1 − so) |
| tc | 103 | T(sc, dc) | 1 | so * do |
| transparent | 106 | Don't care | 0 | (1 − so) * (1 − do) |
| s | 104 & 106 | sc | so | 1 − do |
| dtc | 103 & 105 | T(sc, dc) * so + dc * (1 − so) | 1 | do |
| d | 105 & 106 | dc | do | 1 − so |
| dtc | 103 & 104 | T(sc, dc) * do + sc * (1 − do) | 1 | so |

There are other palette combinations possible, such as those based on regions 103 & 106 and 104 & 105, however the complexity of their color and opacity equations means they are not of interest to the methods described herein.

The palette of contributing values of interest to the preferred embodiment of the present invention comprises s and dtc. As can be seen from Table 2, the formula for dtc is:

$$ro = 1$$

$$rc = T(sc, dc) * so + dc * (1 - so)$$

which is identical to the formula for a graphic element with non-unity opacity combined (using a transfer function) onto an opaque background graphic element (see Equations 5 and 6). Further, the relative frequency of use of each of these values is simply the opacity component of the lower element, and its complement.

There are a number of methods of determining the probability based selection required. In the methods described herein, the techniques of color halftoning are adapted.

In halftoning, a "true color" image, in which each color component of each true color pixel has a large number of possible values, is reduced to a "halftoned" image in which each color component of each halftoned pixel has just one of a small set of discrete color values. The probability of each discrete value is related to the true color value. There are many halftoning methods, however two of the most commonly used methods are error diffusion and dither matrices, both of which are well known in the art.

In the described methods a dither matrix is adapted for use. However an analogous adaptation of any halftoning method, such as error diffusion, is possible. A dither matrix such as the dither matrix 208 of FIG. 2F may be used. The dither matrix is conceptually tiled over the surface of a lower graphic element and used to derive a mask image with one bit of information per pixel. This is achieved by addressing the dither matrix with modulus arithmetic. At each location (i.e. pixel), the opacity channel is compared to the corresponding value in the dither matrix. If the opacity value is greater than the value of the dither matrix, the mask has a one (1) value at that location, else the mask has a value of zero (0).

To achieve the appropriate probability, or relative frequency, of each of the contributing colors, while still taking maximum advantage of graphics acceleration, one or more such single-bit per pixel image masks are generated by halftoning the relative contribution that is required for each contributing color. These image masks are used to mask painting operations of objects consisting of the contributing values— which in some cases are the original operands.

In the preferred embodiment, the final result is achieved using a graphics accelerator (e.g., the graphics accelerator 430), having capability D, by the following numbered steps of the method 300 described with reference to FIG. 3.

1. In 301 the lower graphic element is copied to a temporary area configured within memory 406 without the opacity of the lower graphic element.
2. In 302 the upper graphic element is composited over the temporary area using the transfer function. This results in contributing value dtc which is opaque.
3. In 303, the upper graphic element is copied to a result buffer configured within memory 406. This forms the initial value of the result. This is contributing value s and may be semi-transparent.
4. In 304 the opacity component of the lower graphic element is used, via a halftone dither matrix, to determine a mask.
5. In 305 the temporary area is copied onto the result subject to the mask. That is, values of the temporary area where the mask is one (1) are copied to the result buffer; other values are not used. After this the temporary area configured within the memory 406 may be discarded.

In the common case that the result of step 305 is to be further composited over an opaque background, the above method 300 may be simplified. In particular, the method 300 may be simplified by, at step 303, compositing the upper graphic element s directly over the background instead of copying to the result buffer result, then at step 305 copying the temporary buffer temp where the mask mask is one (1) to the background instead of the result buffer result. This eliminates the need for an intermediate result buffer.

The preferred embodiment relies on the observation that the dtc contribution is completely opaque, so may be copied over the previously painted s contribution thus overriding the value of s. Alternatively, either dtc or s may be generated at each pixel depending on the mask value.

An example of the method 300 will now be described with reference to FIGS. 2A to 2I. FIG. 2A shows a 5×5 pixel upper graphic element 201 which has a color and opacity at each pixel (or location). In this example, the opacity of each pixel of the upper graphic element 201 is 0.5. The 50% opacity is represented diagrammatically by the half shading of each pixel. Similarly, FIG. 2B shows a lower graphic element 202, which is a triangle. The lower graphic element 202 also has a color and opacity at each pixel (or location), and the opacity is similarly 0.5 at each pixel. The color and opacity may be different from object to object and pixel to pixel, however for simplicity in this example, the color and opacity will be assumed to have only one value.

The upper graphic element 201 is to be composited over the lower graphic clement 202 at a location indicated by the dotted outline 203, as seen in FIG. 213. The example will now be explained in the same numbered steps used to describe FIG. 3 above:

1. A temporary buffet 204 is created in memory 406 large enough to cover a bounding box of the lower graphic element 202. As at 301, the lower graphic element 202 is copied to the temporary buffer 204 by the processor 405 without the opacity of the lower graphic element, resulting in shaded pixels 205, as seen in FIG. 2C. In practice the temporary buffer may be the size of the bounding box of the intersection of the bounds of the upper graphic element 201 and the lower graphic element 202. However, the example uses the bounding box of the lower graphic element 202 for clarity. The temporary buffer need not, and in the preferred embodiment does not, support an opacity channel. The lower graphic element 202 is implicitly opaque. The "don't care" pixels outside the bounds of the lower graphic element 202 are marked with crosses 212, as seen in FIG. 2C
2. As at 302, the upper graphic element 201 is composited over the temporary buffer 204 by the processor 405 in concert with graphics accelerator 430 using the transfer function resulting in a combination graphic element in the temporary buffer 204 comprising new pixel values 206, as seen in FIG. 2D. Pixels of the combination graphic element (e.g., 200) are shown as two shaded areas to represent the weighted average of two contributing colors, those being the transfer color T(sc, dc) and the color dc of the lower graphic element. In this example, since the upper graphic element 201 is 0.5 opaque, a 0.5 and 0.5 weight is used for each color. The over operator and the transfer function have been used to achieve this, which has resulted in composited opaque pixels, such as 212, outside the bounds of the dc pixels previously generated. However the composited opaque pixels, such as 212, outside the bounds will be ignored, so their generation is not important.
3. As at 303, the upper graphic element 201 is copied by the processor 405 to the result buffer 207, as seen in FIG. 2E. This forms the initial value of the result graphical element 210. The initial value is contributing value s and includes an opacity channel.
4.
As at 304, the opacity component of the lower graphic element 202 is used, via the halftone dither matrix 208 to determine a mask 209, as seen in FIG. 2G. The dither matrix 208 is a 4×4 dither matrix for the simplicity of the example. In practice a larger dither matrix may be used. When a threshold value of 0.5 is applied to the dither matrix 208, a checkerboard pattern results, which is reflected in the checkerboard pattern of the mask 209. Values outside the bounds of the lower graphic element result in zero (blank) values in the mask 209.
5. As at 305, the temporary buffer 206 is copied onto the result buffer 207 by the processor 405 according to the mask 209 to produce a result graphic element 210 of FIG. 2H. That is, values of the temporary buffer 206, including the implicit opacity of the temporary buffer 206, where the mask 209 is 1 (black) are copied to the result buffer 207 to produce the result graphic element 210. Other values are not used.

The result graphic element 210 as seen in FIG. 2H, although different from a true result graphic element 211 in detail (see FIG. 2I), has similar visual appearance for large collections of pixels, especially in high resolution prints.

The method 300 requires accelerator capability D., for step 302 of the method 300. Where capabilities are more limited, each of the contributing color values sc, dc, and tc may be copied to the result graphic element in the same manner using the relative probabilities for those values listed in the first palette of Table 1 above. This approach only requires accelerator capability A., above, which is common to almost all graphic accelerators. However, the result graphic element has a higher granularity than the method 300.

Thus, by using a series of masked and/or un-masked painting operations (preferably accelerated), an upper graphic element, a lower graphic element, or a combination of the two, may be painted to a result graphic element in patterns. These patterns achieve a visually similar result graphic element to generalized Porter and Duff compositing in the presence of a transfer function, although different in detailed pixel values from the true color.

The aforementioned preferred method(s) comprise a particular control flow. There are many other variants of the preferred method(s) which use different control flows without departing the spirit or scope of the invention. Furthermore one or more of the steps of the preferred method(s) may be performed in parallel rather sequentially.

INDUSTRIAL APPLICABILITY

It is apparent from the above that the arrangements described are applicable to the computer and data processing industries.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The claims defining the invention are as follows:

1. A computer implemented method of determining a color at a selected location in an overlapping region of a first graphic element and a second graphic element, wherein the first graphic element has, at the selected location, a first color value and a first partial opacity value, and the second graphic element has, at the selected location, a second color value and a second partial opacity value, the computer comprising a processor configured to implement the method and a computer readable storage medium to store the color at the selected location, the method comprising the steps of:

copying the first color value of the first graphic element to a temporary buffer of the computer readable storage medium, said first color value being independent of the first partial opacity value;

compositing the second color value of the second graphic element with the first color value in the temporary buffer to produce a transfer color in the temporary buffer, said transfer color being independent of the first and second partial opacities;

copying the second color value and the second partial opacity value of the second graphic element to a result buffer of the computer readable storage medium;

determining a mask by applying a halftoning process to the first partial opacity value of the first graphic element, wherein the mask is adapted for determining if said transfer color in the temporary buffer is to be copied to a result buffer at the selected location; and copying the transfer color in the temporary buffer to the result buffer according to the determined mask.

2. An apparatus for determining a color at a selected location in an overlapping region of a first graphic element and a second graphic element, wherein the first graphic element has, at the selected location, a first color value and a first partial opacity value, and the second graphic element has, at the selected location, a second color value and a second partial opacity value, said apparatus comprising:

means for copying the first color value of the first graphic element to a temporary buffer of the computer readable storage medium, said first color value being independent of the first partial opacity value;

means for compositing the second color value of the second graphic element with the first color value in the temporary buffer to produce a transfer color in the temporary buffer, said transfer color being independent of the first and second partial opacities;

means for copying the second color value and the second partial opacity value of the second graphic element to a result buffer of the computer readable storage medium ;

means for determining a mask by applying a halftoning process to the first partial opacity value of the first graphic element, wherein the mask is adapted for determining if said transfer color in the temporary buffer is to be copied to a result buffer at the selected location; and means for copying the transfer color in the temporary buffer to the result buffer according to the determined mask.

3. A non-transitory computer readable storage medium having a computer program code recorded thereon for controlling the operation of a computer apparatus on which the program code is executable to determine a color at a selected location in an overlapping region of a first graphic element and a second graphic element, wherein the first graphic element has, at the selected location, a first color value and a first partial opacity value, and the second graphic element has, at the selected location, a second color value and a second partial opacity value, the computer program comprising:

code for copying the first color value of the first graphic element to a temporary buffer of the computer readable medium, said first color value being independent of the first partial opacity value;

code for compositing the second color value of the second graphic element with the first color value in the temporary buffer to produce a transfer color in the temporary buffer, said transfer color being independent of the first and second partial opacities;

code for copying the second color value and the second partial opacity value of the second graphic element to a result buffer of the computer readable storage medium;

code for determining a mask by applying a halftoning process to the first partial opacity value of the first graphic element, wherein the mask is adapted for determining if said transfer color in the temporary buffer is to be copied to a result buffer at the selected location; and code for copying the transfer color in the temporary buffer to the result buffer according to the determined mask.

4. A system for determining a color at a selected location in an overlapping region of a first graphic element and a second graphic element, wherein the first graphic element has, at the selected location, a first color value and a first partial opacity value, and the second graphic element has, at the selected location, a second color value and a second partial opacity value, the system comprising:

a memory for storing data and a computer program; and a processor coupled to said memory for executing said computer program, said computer program comprising instructions for:

copying the first color value of the first graphic element to a temporary buffer of the computer readable storage medium, said first color value being independent of the first partial opacity value;

compositing the second color value of the second graphic element with the first color value in the temporary buffer to produce a transfer color in the temporary buffer, said transfer color being independent of the first and second partial opacities;

copying the second color value and the second partial opacity value of the second graphic element to a result buffer of the computer readable storage medium;

determining a mask by applying a halftoning process to the first partial opacity value of the first graphic element, wherein the mask is adapted for determining if said transfer color in the temporary buffer is to be copied to a result buffer at the selected location; and copying the transfer color in the temporary buffer to the result buffer according to the determined mask.

* * * * *